United States Patent
Maule et al.

(10) Patent No.: US 10,354,561 B2
(45) Date of Patent: Jul. 16, 2019

(54) BLOCK OUT LABEL, LABEL SHEET, AND RELATED METHOD

(75) Inventors: Alan W. Maule, Brea, CA (US); Brian R. McCarthy, Anaheim Hills, CA (US); Martin Utz, Gmund am Tegernsee (DE); Andrew J. Conti, Gates Mills, OH (US); Linwood G. Koger, South Euclid, OH (US); Kenneth J. Wolfe, Altoona, PA (US)

(73) Assignee: CCL LABEL, INC., Framingham, MA (US)

( * ) Notice: Subject to any disclaimer, the term of this patent is extended or adjusted under 35 U.S.C. 154(b) by 469 days.

(21) Appl. No.: 12/205,774

(22) Filed: Sep. 5, 2008

(65) Prior Publication Data

US 2009/0068389 A1 Mar. 12, 2009

Related U.S. Application Data

(60) Provisional application No. 60/970,917, filed on Sep. 7, 2007, provisional application No. 61/051,185, filed on May 7, 2008.

(51) Int. Cl.
*G09F 3/02* (2006.01)
*G09F 3/10* (2006.01)
(Continued)

(52) U.S. Cl.
CPC .............. *G09F 3/10* (2013.01); *B32B 7/023* (2019.01); *B32B 29/002* (2013.01); *B32B 33/00* (2013.01); *C09J 7/20* (2018.01); *C09J 7/21* (2018.01); *C09J 7/29* (2018.01); *C09J 7/50* (2018.01); *D21H 19/38* (2013.01); *D21H 19/385* (2013.01); *D21H 19/42* (2013.01); *D21H 19/66* (2013.01); *D21H 19/82* (2013.01); *D21H 19/822* (2013.01); *D21H 19/826* (2013.01);
(Continued)

(58) Field of Classification Search
None
See application file for complete search history.

(56) References Cited

U.S. PATENT DOCUMENTS 3,904,876 A * 9/1975 Arendt ............................. 378/53
4,510,020 A * 4/1985 Green .................... D21C 9/004
162/169
(Continued)

FOREIGN PATENT DOCUMENTS

CN 1276303 A * 12/2000
CN 1517492 A * 8/2004
(Continued)

OTHER PUBLICATIONS

English Abstract of JP 2000-141576 A, May 2000.*
(Continued)

*Primary Examiner* — Jeffrey A Vonch
(74) *Attorney, Agent, or Firm* — McDonald Hopkins LLC

(57) ABSTRACT

The present invention includes a label, a label sheet and a method for manufacturing the label. The label includes a paper facestock having first and second surfaces and a layer of pressure sensitive adhesive proximal to the second surface. The label can be adhered to a substrate having preapplied indicia to cover the indicia and the label is opaque enough to prevent the viewing of the covered indicia while matching the color of the substrate.

24 Claims, 7 Drawing Sheets

(51) Int. Cl.
  *C09J 7/21* (2018.01)
  *C09J 7/50* (2018.01)
  *B32B 7/023* (2019.01)
  *B32B 27/10* (2006.01)
  *B32B 27/20* (2006.01)
  *B32B 29/00* (2006.01)
  *B32B 33/00* (2006.01)
  *D21H 19/38* (2006.01)
  *D21H 19/66* (2006.01)
  *D21H 19/82* (2006.01)
  *D21H 21/28* (2006.01)
  *D21H 21/30* (2006.01)
  *C09J 7/29* (2018.01)
  *C09J 7/20* (2018.01)
  *D21H 19/42* (2006.01)
  *B32B 7/06* (2019.01)
  *B32B 29/06* (2006.01)
  *C09J 7/40* (2018.01)
  *D21H 19/44* (2006.01)
  *D21H 17/67* (2006.01)
  *D21H 19/84* (2006.01)
  *D21H 27/14* (2006.01)
  *B32B 7/12* (2006.01)

(52) U.S. Cl.
  CPC .............. *G09F 3/02* (2013.01); *B32B 7/06* (2013.01); *B32B 7/12* (2013.01); *B32B 27/10* (2013.01); *B32B 27/20* (2013.01); *B32B 29/00* (2013.01); *B32B 29/06* (2013.01); *B32B 2250/03* (2013.01); *B32B 2250/04* (2013.01); *B32B 2250/05* (2013.01); *B32B 2255/12* (2013.01); *B32B 2255/28* (2013.01); *B32B 2264/102* (2013.01); *B32B 2264/104* (2013.01); *B32B 2264/108* (2013.01); *B32B 2307/406* (2013.01); *B32B 2307/4023* (2013.01); *B32B 2307/4026* (2013.01); *B32B 2307/41* (2013.01); *B32B 2307/416* (2013.01); *B32B 2307/422* (2013.01); *B32B 2307/50* (2013.01); *B32B 2519/00* (2013.01); *C09J 7/40* (2018.01); *C09J 2203/334* (2013.01); *C09J 2205/106* (2013.01); *D21H 17/675* (2013.01); *D21H 19/44* (2013.01); *D21H 19/84* (2013.01); *D21H 21/28* (2013.01); *D21H 21/285* (2013.01); *D21H 21/30* (2013.01); *D21H 27/14* (2013.01); *G09F 2003/0201* (2013.01); *G09F 2003/022* (2013.01); *G09F 2003/0216* (2013.01); *G09F 2003/0217* (2013.01); *G09F 2003/0226* (2013.01); *G09F 2003/0239* (2013.01); *G09F 2003/0257* (2013.01); *G09F 2003/0272* (2013.01); *Y10T 428/14* (2015.01); *Y10T 428/1467* (2015.01); *Y10T 428/1476* (2015.01); *Y10T 428/1495* (2015.01); *Y10T 428/24942* (2015.01); *Y10T 428/28* (2015.01); *Y10T 428/2843* (2015.01); *Y10T 428/2848* (2015.01); *Y10T 428/31* (2015.01)

(56) References Cited

U.S. PATENT DOCUMENTS

| | | | |
|---|---|---|---|
| 4,674,771 A * | 6/1987 | Thompson, II | B41L 1/22 283/81 |
| 4,763,930 A * | 8/1988 | Matney | 283/81 |
| 4,863,772 A * | 9/1989 | Cross | 428/41.8 |
| 5,039,378 A * | 8/1991 | Pommier | D21F 11/04 162/128 |
| 5,131,910 A * | 7/1992 | Breault | 8/400 |
| 5,192,611 A | 3/1993 | Tomiyama et al. | |
| 5,314,560 A * | 5/1994 | Pritchet | 156/238 |
| 5,354,588 A | 10/1994 | Mitchell et al. | |
| 5,417,790 A | 5/1995 | Petrou | |
| 5,418,026 A * | 5/1995 | Dronzek et al. | 428/41.4 |
| 5,547,738 A | 8/1996 | Mitchell et al. | |
| 5,735,549 A | 4/1998 | Konkol et al. | |
| 5,785,748 A * | 7/1998 | Banford et al. | 106/443 |
| 5,800,893 A | 9/1998 | Harden | |
| 5,833,747 A * | 11/1998 | Bleakley et al. | 106/464 |
| 5,914,165 A | 6/1999 | Freedman | |
| 5,919,537 A | 7/1999 | Niazy | |
| 5,972,155 A | 10/1999 | Cooprider et al. | |
| 5,981,009 A | 11/1999 | Iacono et al. | |
| 6,033,444 A * | 3/2000 | Ahlinder | C09B 67/0033 106/495 |
| 6,143,408 A * | 11/2000 | Fujita | 428/355 R |
| 6,235,344 B1 * | 5/2001 | Whiteman | C09J 7/21 427/180 |
| 6,254,138 B1 | 7/2001 | Rawlings et al. | |
| 6,358,588 B1 | 3/2002 | Edwards et al. | |
| 6,387,500 B1 * | 5/2002 | Behl | B41M 5/52 106/436 |
| 6,461,706 B1 | 10/2002 | Freedman et al. | |
| 6,503,620 B1 * | 1/2003 | Xie et al. | 428/354 |
| 6,521,312 B1 | 2/2003 | Keiser | |
| 6,576,325 B1 | 6/2003 | Yamanaka et al. | |
| 6,663,947 B2 | 12/2003 | Freedman et al. | |
| 6,770,344 B2 | 8/2004 | Moriwaki et al. | |
| 6,780,484 B2 | 8/2004 | Kobe et al. | |
| 6,848,205 B2 | 2/2005 | Rieger et al. | |
| 6,916,518 B2 | 7/2005 | Chen | |
| 6,951,683 B2 | 10/2005 | Blackwell | |
| 6,984,429 B2 | 1/2006 | Thunhorst et al. | |
| 7,138,172 B2 | 11/2006 | Marks | |
| 7,306,668 B2 * | 12/2007 | Pring | C09C 1/42 106/486 |
| 2002/0090482 A1 | 7/2002 | Motomiya | |
| 2003/0104180 A1 * | 6/2003 | Shikano | B32B 7/12 428/195.1 |
| 2003/0188393 A1 * | 10/2003 | Tindal | 8/532 |
| 2004/0038056 A1 * | 2/2004 | Song et al. | 428/500 |
| 2004/0202833 A1 * | 10/2004 | Anderson et al. | 428/195.1 |
| 2005/0258636 A1 * | 11/2005 | Bova | G09F 3/005 283/81 |
| 2006/0155005 A1 * | 7/2006 | Kondo et al. | 523/160 |
| 2007/0054141 A1 * | 3/2007 | Francis et al. | 428/480 |
| 2007/0059453 A1 * | 3/2007 | Benson | 427/402 |
| 2007/0062653 A1 * | 3/2007 | Duggirala et al. | 162/9 |
| 2007/0077410 A1 * | 4/2007 | Shi | 428/317.1 |
| 2007/0103528 A1 * | 5/2007 | Pearl et al. | 347/101 |
| 2007/0120283 A1 | 5/2007 | Hostetter et al. | |
| 2007/0141291 A1 | 6/2007 | Buck | |
| 2007/0170716 A1 | 7/2007 | Cerkleski | |
| 2007/0202281 A1 * | 8/2007 | Nelli | B41M 5/508 428/32.34 |
| 2007/0231571 A1 | 10/2007 | Lane et al. | |
| 2007/0248810 A1 | 10/2007 | McGee et al. | |
| 2007/0292709 A1 | 12/2007 | Oishi et al. | |
| 2007/0298228 A1 | 12/2007 | Ohkawachi et al. | |
| 2008/0032118 A1 * | 2/2008 | Kato | C09J 7/20 428/332 |
| 2008/0035292 A1 * | 2/2008 | Singh | D21H 17/28 162/175 |
| 2008/0199647 A1 | 8/2008 | Blackwell et al. | |
| 2008/0206461 A1 | 8/2008 | Patel | |
| 2008/0311369 A1 * | 12/2008 | Yokoyama | B32B 7/12 428/220 |

(56) References Cited

U.S. PATENT DOCUMENTS

| | | | |
|---|---|---|---|
| 2009/0197032 A1 | 8/2009 | Didulo et al. | |
| 2010/0028670 A1* | 2/2010 | Martinet | D21H 19/36 428/351 |
| 2010/0285258 A1* | 11/2010 | Huynh | C09J 7/29 428/40.5 |

FOREIGN PATENT DOCUMENTS

| | | | | |
|---|---|---|---|---|
| GB | 1404018 A | * | 8/1975 | ............... G09F 3/02 |
| GB | 2109302 A | * | 6/1983 | ............. B32B 29/00 |
| GB | 2209992 A | * | 6/1989 | ............ B42D 15/025 |
| JP | 49-093462 A | * | 9/1974 | |
| JP | 51092095 U | * | 7/1976 | ............. B32B 29/00 |
| JP | 51110046 U | * | 9/1976 | |
| JP | 51110047 U | * | 9/1976 | |
| JP | 56008480 A | * | 1/1981 | |
| JP | 56068187 A | * | 6/1981 | ........... B42D 15/025 |
| JP | 58180067 U | * | 12/1983 | |
| JP | 60019074 U | * | 2/1985 | |
| JP | 61119800 A | * | 6/1986 | |
| JP | 62141087 A | * | 6/1987 | |
| JP | 05043846 A | * | 2/1993 | |
| JP | 05058392 U | * | 8/1993 | |
| JP | 06089309 B2 | * | 11/1994 | |
| JP | 11106713 A | * | 4/1999 | |
| JP | 2000141576 A | * | 5/2000 | ............. B32B 29/04 |
| JP | 2000211274 A | * | 8/2000 | |
| JP | 2000335102 A | * | 12/2000 | |
| JP | 2002211630 A | * | 7/2002 | ............. B65D 65/40 |
| JP | 2003108007 A | * | 4/2003 | |
| JP | 2004151270 A | * | 5/2004 | |
| JP | 2004160868 A | * | 6/2004 | |
| JP | 2004250834 A | * | 9/2004 | |
| JP | 2004331806 A | * | 11/2004 | |
| JP | 2005068214 A | * | 3/2005 | |
| JP | 2005154942 A | * | 6/2005 | ............. D21H 27/00 |
| JP | 2006028706 A | * | 2/2006 | |
| WO | WO-9521963 A1 | * | 8/1995 | ............. B65D 65/14 |
| WO | 98-04405 | | 2/1998 | |
| WO | 2007-029194 | | 3/2007 | |
| WO | WO 2007048878 A1 | * | 5/2007 | ............. D21H 19/82 |

OTHER PUBLICATIONS

Handbook of Physical Testing of Paper, vol. 2, 2nd Edition, 2002 (no month).*
Digital Printing Glossary—Gloss, Dec. 2007.*
Understanding Brightness and Whiteness, Mar. 2003 (Wayback Machine).*
Machine Translation of JP 2002211630 A, Jul. 2002.*
Machine Translation of JP 2005154942 A, Jun. 2005.*
English Abstract for JP 49-093462 A, Sep. 1974.*
Machine Translation of JP 2006028706 A, Feb. 2006.*
English Translation of JP 49-093462 A, Sep. 1974.*
Puebla C, Whiteness Assessment: A Primer, Sep. 2006, Axiphos GmbH.*
Machine Translation of JP-05058392-U, Aug. 1993 (Year: 1993).*
Machine Translation of JP-06089309-B2, Nov. 1994 (Year: 1994).*
Machine Translation of JP-62141087-A, Jun. 1987 (Year: 1987).*
Machine Translation of claims of JP-58180067-U, Dec. 1983 (Year: 1983).*
The Biofare Company, UPM Fine, Apr. 2004 (Year: 2004).*
The Paper Categorization Meeting, Jun. 2006 (Year: 2006).*
Machine Translation of 51-110047 U, Jun. 1976 (Year: 1976).*
Machine Translation of 51-092095 U, Jul. 1976 (Year: 1976).*
Machine Translation of 56-068187 A, Jun. 1981 (Year: 1981).*
Machine Translation of 58-180067 U, Dec. 1983 (Year: 1983).*
Machine Translation of 60-019074 U, Feb. 1985 (Year: 1985).*
International Search Report and Written Opinion dated May 6, 2009 from corresponding International Application No. PCT/US2008/075490.
Amendment under Article 34 dated Aug. 5, 2009 from corresponding International Application No. PCT/US2008/075490.
Reflectance Measurements: Specular Included versus Specular Excluded, HunterLab, http://www.hunterlab.com/appnotes/an04_01r2.pdf.
Demystifying Three Key Paper Properties, Xerox Corporation, http://www.xerox.com/downloads/usa/en/t/ThreeKeyPaperPropertiesWhitePaper.pdf.
Does Brightness Equal Brightness?, United Stationers Supply Company, http://paperrap.com/papernews/archive/dec01.asp.
Reviewing the Concept of Paper Brightness, Axiphos GmbH, http://www.axiphos.com/BrightnessReview.pdf.
Amendment dated Nov. 18, 2010 from related Australian Application No. 2008296069.
Office Action dated May 6, 2010 from related Chilean Application No. 2636-2008.
Response dated Jul. 13, 2010 from related Chilean Application No. 2636-2008.
Office Action dated Dec. 10, 2010 from related Chilean Application No. 2636-2008.
Response dated Apr. 11, 2011 in 4448-CL from related Chilean Application No. 2636-2008.
Office Action dated Jun. 29, 2011 from related New Zealand Application No. 583406.
IPRP dated Oct. 28, 2009 from related International Application No. PCT/US2008/75490.

* cited by examiner

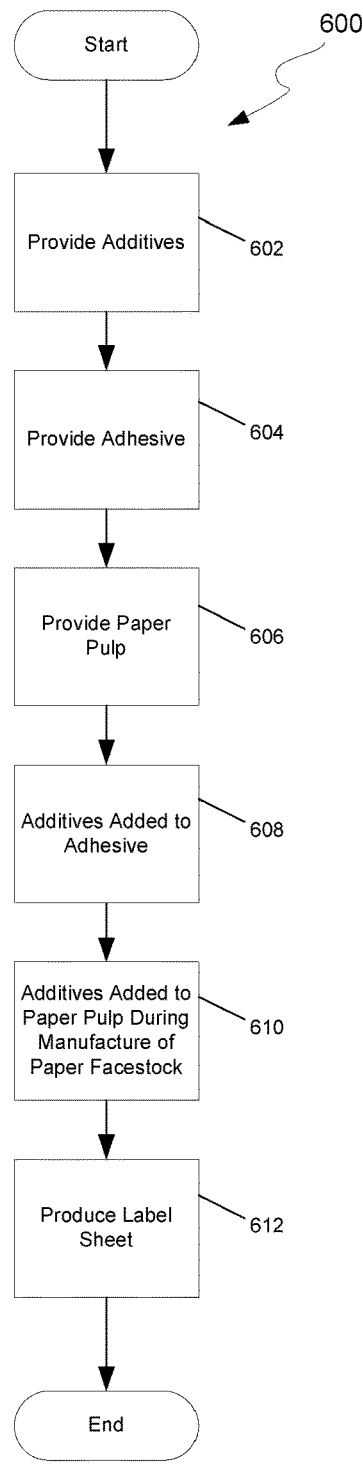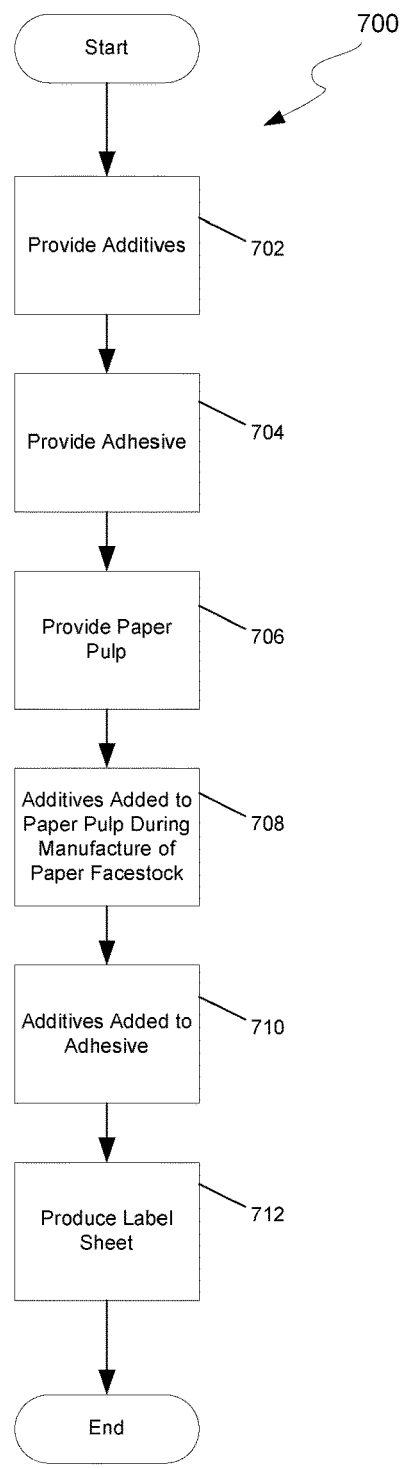
FIG. 6
FIG. 7

BLOCK OUT LABEL, LABEL SHEET, AND RELATED METHOD

CROSS-REFERENCE TO RELATED PATENT APPLICATION

Priority is claimed under 35 U.S.C. § 119(e) to U.S. Provisional Patent Application No. 60/970,917, filed Sep. 7, 2007, entitled "Machine Printable Opaque Labels," by Alan Maule and Brian McCarthy, and to U.S. Provisional Patent Application No. 61/051,185, filed May 7, 2008, entitled "Block Out Labels," by Alan Maule, Brian McCarthy and Martin Utz, both applications of which are incorporated by reference herein in their entirety.

TECHNICAL FIELD OF THE INVENTION

The present invention is related to labels. More specifically, the invention relates to labels that prevent viewing of covered indicia through the label when applied to a substrate or another label.

BACKGROUND

Labels, particularly those for addressing and shipping, are applied to materials that are frequently reused. A shipping container, box or envelope that arrives in a facility can be reused to send materials or documents to another facility by applying a newly addressed label over the existing address or addressing label on the container. It is highly desired that the previous addressing information is not visible through the newly applied address label, especially in automated handling systems where the previous information could interfere with routing of the container, box or envelope. Furthermore, simply increasing the thickness of the label to completely hide underlying indicia can result in difficulties printing through printers or difficulties in automated handling systems.

Current labels that are used to hide underlying indicia use a color coating on the back side of the label between the facestock material and the adhesive. In particular, very dark or black coatings are used to effectively block out the underlying indicia. While the resulting label may effectively block out the underlying indicia, the dark coatings cause the facestock to appear gray, dingy and unprofessional during use. This is especially the case when the label is being used on a white business envelope where a professional appearance, even when reusing an envelope, is important.

There currently exists a need for a white mailing label that is effective at blocking out underlying indicia while matching the white appearance of an envelope to which it is attached.

SUMMARY

The present invention includes a label having a paper facestock with a first surface and a second surface. The label also has a layer of pressure sensitive adhesive proximal to the second surface of the paper facestock. The label has an opacity greater than or equal to approximately 94.8%. Additionally, the label has a whiteness index greater than or equal to approximately 155; or a brightness greater than or equal approximately 90.2%, a CIELAB L* of greater than or equal to 92.5 and a CIELAB b* or less than or equal to −0.91.

In other, more detailed features of the invention, a first layer and a second layer are coupled between the paper facestock and the layer of pressure sensitive adhesive. The first layer includes a primer and at least one first layer additive, and the first layer is configured to absorb light. The second layer includes a primer and at least one second layer additive, and the second layer is configured to reflect light.

In another, more detailed feature of the invention, the at least one first layer additive includes carbon black and the at least one second layer additive includes titanium dioxide.

In another, more detailed feature of the invention, the second layer is adjacent to the second surface of the paper facestock.

In yet another, more detailed feature of the invention, the paper facestock includes at least one facestock additive and the layer of pressure sensitive adhesive includes at least one adhesive additive. The inclusion of the at least one facestock additive and the inclusion of the at least one adhesive additive results in the label having an opacity that is greater than if the at least one facestock additive and the at least one adhesive additive were not included in their respective layers.

Another, more detailed feature of the invention includes the at least one facestock additive that is titanium dioxide, precipitated calcium carbonate or ash. The at least one adhesive additive includes carbon black.

Another, more detailed feature of the invention includes a pigmented layer that is coupled between the paper facestock and the pressure sensitive adhesive. The pigmented layer can include precipitated calcium carbonate and a blue pigment.

Another, more detailed feature of the invention includes the paper facestock having at least one whiteness enhancer added.

In yet another, more detailed feature of the invention, the first surface of the paper facestock has an indicia-accepting layer proximal to the first surface.

In another, more detailed feature of the invention, the pressure sensitive adhesive can be a permanent pressure sensitive adhesive.

Another, more detailed feature of the present invention includes a label having an opacity greater than or equal to approximately 99.7%

Another exemplary embodiment of the present invention includes a label sheet. The label sheet includes a label stock having a paper facestock with a surface and a layer of pressure sensitive adhesive. The layer of pressure sensitive adhesive is proximal to the surface of the facestock. The label sheet also includes a release-coated liner releasably coupled to the layer of pressure sensitive adhesive. The label stock has an opacity greater than or equal to approximately 94.8%. Additionally, the label stock has a whiteness index greater than or equal to approximately 155; or a brightness greater than or equal approximately 90.2%, a CIELAB L* of greater than or equal to 92.5 and a CIELAB b* or less than or equal to −0.91.

In another, more detailed feature of the invention, the label sheet has a total caliper of less than or equal to approximately 0.01 inch.

In another, more detailed feature of the invention, the label sheet has at least one corner that can be characterized as having a curl value between approximately −0.5 inch and approximately +0.25 inch.

In yet another, more detailed feature of the invention, the label sheet has a force required to separate the label stock from the release-coated liner of at least 50 grams per 2 inches.

An exemplary method according to the invention is a method for manufacturing a label stock. The method includes the steps of providing a paper facestock, providing a pressure sensitive adhesive and coupling the pressure sensitive adhesive to the paper facestock. The label stock has an opacity greater than or equal to approximately 94.8%. Additionally, the label stock has a whiteness index greater than or equal to approximately 155; or a brightness greater than or equal approximately 90.2%, a CIELAB L* of greater than or equal to 92.5 and a CIELAB b* or less than or equal to −0.91.

In another, more detailed feature of the invention, the pressure sensitive adhesive is in the form of a layer and the step of coupling the layer of pressure sensitive adhesive to the paper facestock includes laminating the layer of pressure sensitive adhesive to the paper facestock.

A more detailed feature of the invention includes providing the pressure sensitive layer on a release-coated liner.

Another, more detailed feature include the label stock configured so that the paper facestock and the pressure sensitive adhesive are permanently attached.

Other features of the invention should become apparent to those skilled in the art from the following description of the preferred embodiment taken in conjunction with the accompanying drawings, which illustrate, by way of example, the principles of the invention, the invention not being limited to any particular preferred embodiment(s) disclosed.

BRIEF DESCRIPTION OF THE DRAWINGS

These and other features, aspects and advantages of the present invention will become better understood with reference to the following description, appended claims and accompanying drawings, where:

FIG. 6 is a flowchart of an example method to produce a label sheet according to the invention.

FIG. 7 is a flowchart of another example method to produce a label sheet according to the invention.

Unless otherwise indicated, the illustrations in the above figures are not necessarily drawn to scale.

DETAILED DESCRIPTION OF THE PREFERRED EMBODIMENTS

Figure 1:
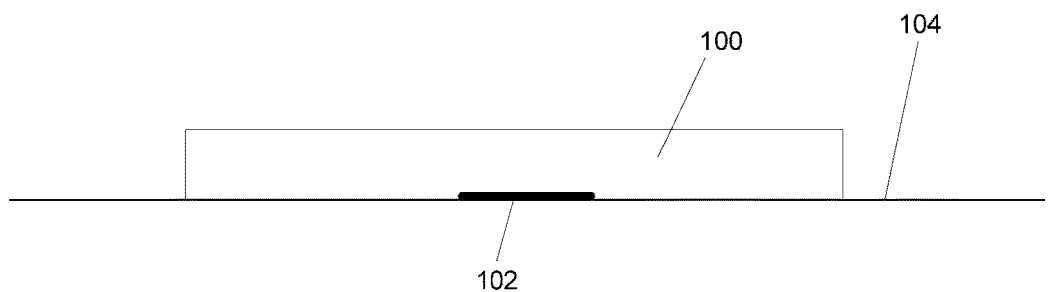
FIG. 1 is a sectional view of an example label according to a preferred embodiment applied to a substrate.

Referring to FIG. 1, the present invention concerns labels 100, label sheets and related methods. The labels are used to cover existing indicia 102 on substrates 104, for example packages and envelopes, so that the substrate can be reused. In use, the labels prevent viewing of the underlying indicia 102. The label embodiments of the present invention are characterized by their properties, namely opacity, brightness, whiteness index and color.

As used herein, opacity is defined as the measurement of the ability of an object to prevent the passage of light through it. The higher the measure of opacity, the more opaque the object 100 is and the more difficult it is to discern underlying indicia 102. Objects can have increased opacity measurements through the addition of materials designed to increase opacity, for example, by using additional layers of materials or by increasing the amount of material that light must travel through. It is possible for an object to be opaque to one type of light and not to other types, for example, an object may be opaque to ultra-violet light but transparent to visible light. In the present context, the opacity of the labels of the present invention is meant to encompass being opaque to light.

Brightness, as used herein, is defined as a measurement of the amount of light reflected from the surface of an object 100. Brightness of a surface is determined by following the Technical Association of the Pulp and Paper Industry ("TAPPI") T-452 om-92 test method, incorporated herein by reference in its entirety, and is based upon reflection of blue light of 457 nm wavelength.

Whiteness index, as used herein, is based upon the ASTM E313 specification, which is incorporated herein by reference in its entirety. Whiteness is the degree to which a surface matches a white reference standard.

There are many alternate ways to describe color. Color, as used herein, is the color space defined as CIE L*a*b* (CIELAB), developed by the International Commission on Illumination (Commission Internationale d'Eclairage or CIE). In this 3-dimensional color space system, L* (CIELAB L*) represents the lightness of the color and ranges from 0 (black) to 100 (white), a* represents the color's position along the red(magenta)/green axis (negative values represent green and positive values represent red or magenta), and b* (CIELAB b*) represents the color's position along the blue/yellow axis (negative values represent blue and positive values represent yellow).

Figure 2:
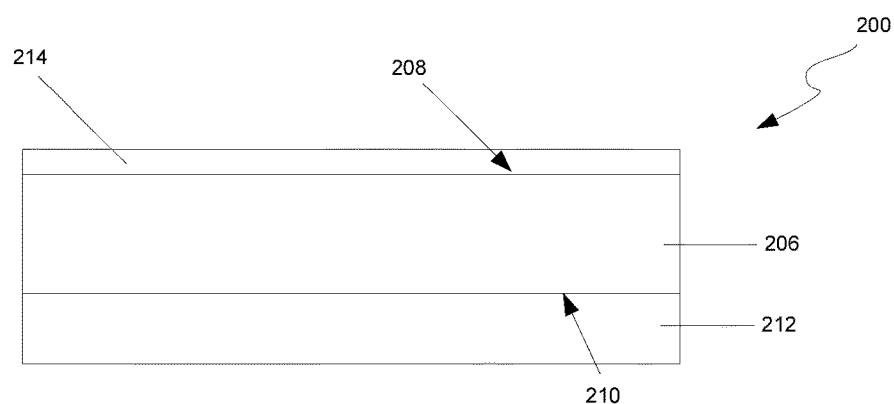
FIG. 2 is a sectional view of an example label according to a preferred embodiment.

A sectional view of a label 200 according to a first label embodiment is shown in FIG. 2 and includes a paper facestock 206 having a first surface 208 and a second surface 210, and a layer of pressure sensitive adhesive ("PSA") 212 proximal to the second surface of the paper facestock. Proximal, as used herein, means nearby and does not preclude intervening structures, for example, additional layers or gaps. The label can optionally include an indicia-accepting layer 214 proximal to the first surface of the paper facestock.

The label 200 is constructed to achieve an opacity of greater than or equal to approximately 94.8%, a brightness value of greater than or equal to approximately 90.2%, a CIELAB L* greater than or equal to approximately 92.5%, and a CIELAB b* less than or equal to approximately −0.91. These properties may be achieved by modifying the paper facestock 206, the pressure sensitive adhesive 212, or both. Modifications can include the use of additives in the paper facestock or pressure sensitive adhesive and the use of additional thin layers of materials, as will be described below. Alternatively, the label is constructed to have a whiteness index greater than or equal to approximately 155. Furthermore, additional steps can be taken to increase opacity of the paper during manufacture including, for example, increasing the paper density, increasing the paper thickness, increasing the basis weight and/or increasing binder or sizing levels.

Figure 3:
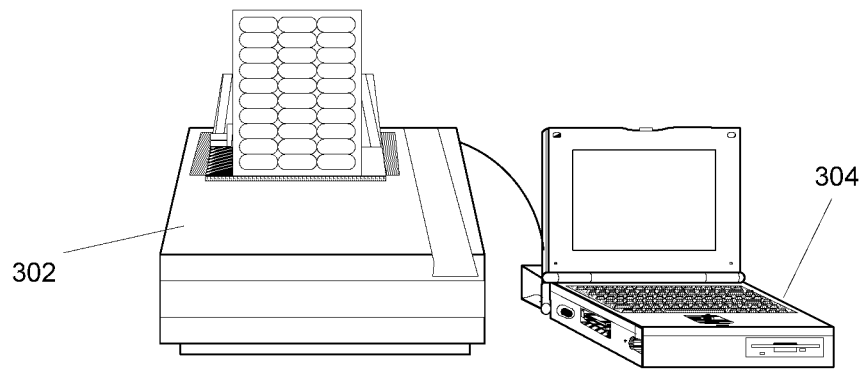
FIG. 3 is a perspective view of an example label sheet according to a preferred embodiment in conjunction with a computer-based printer system.

Paper facestocks 206 suitable for use include 504 offset white laser paper available from paper manufacturers including Domtar Corporation (Montreal, Canada), International Paper Company (Memphis, Tenn.), Glatfelter (York, Pa.), Boise Incorporated (Boise, Id.) and others. Paper facestocks up to 65# or more can be used as facestock, however, increasing basis weights, while increasing opacity, can cause errors in printers 302 and mail-handling processes (see FIG. 3). Paper facestocks less that 50# can also be used.

Suitable adhesives 212 include pressure sensitive adhesives as well as others, for example, gum-based adhesives. Pressure sensitive adhesives can include emulsion and hot melt adhesives. The pressure sensitive adhesives can be permanent, removable or ultraremovable. Acrylic-based, rubber-based and silicone-based pressure sensitive adhesives can be used, as well as tackified pressure sensitive adhesives.

Adhesive coat weights of approximately 20 grams per square meter ($g/m^2$) are preferred. Coat weights significantly greater than approximately 25 $g/m^2$ are less desirable because the adhesive 212 can ooze from under the label 200 causing errors in printers. Adhesive ooze after application of the label to a substrate 104 can cause adhesion to additional surfaces, for example, a label with a high coat weight adhesive attached to an envelope can adhere to other envelopes during a mail-handling process. Coat weights significantly less than approximately 15 $g/m^2$ can have poor adhesion to substrates causing the label to lift or pull off of the substrate to which it is attached.

In another embodiment, the label 200 has an opacity that is greater than or equal to approximately 99.7%.

Figure 4:
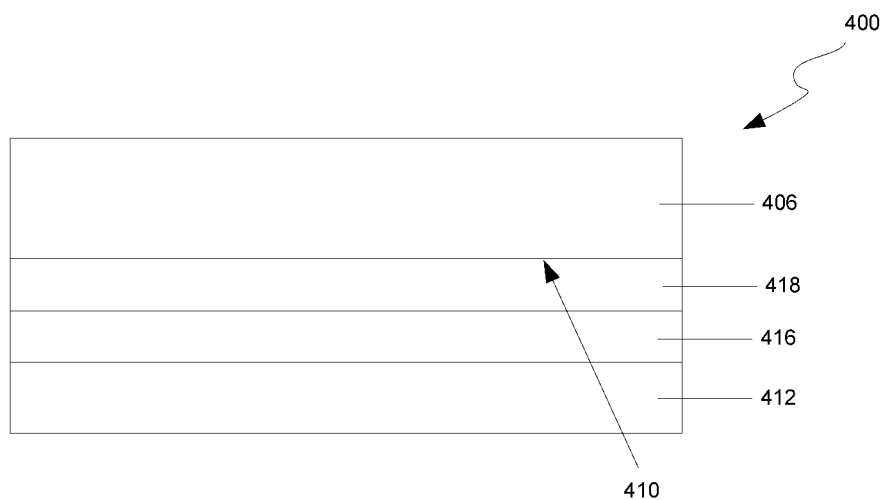
FIG. 4 is a sectional view of another example label according to a preferred embodiment.

A label 400 according to second label embodiment is shown in FIG. 4. In this label embodiment, the paper facestock 406 is coated on its second surface 410 with a second layer 418 including a primer and at least one second layer additive. The second surface is also coated with a first layer 416 including a primer and at least one first layer additive. The first and second layers are coupled between the paper facestock and the adhesive 412. The first layer is configured to absorb light and the second layer is configured to reflect light.

The primer of the first and second layers 416 and 418, respectively, can be the same, or they can be different primers. Materials suitable for use as primers are compatible with the additives included in the layer; the additives should remain evenly dispersed in the primer. The primers are preferably aqueous dispersions of synthetic latex. Dispersions including polyvinyl acetate, styrene butadiene rubber, polyvinyl alcohol, starch and styrene acrylics are non-limiting examples of suitable primers.

The additives in the first layer 416 are chosen to absorb light, thereby increasing the opacity of the layer compared to a similar layer without the additive. As used herein, the phrase "increasing the opacity" means the opacity of a material is greater than the opacity of another material. Suitable first layer additives include but are not limited to carbon black, metallic flakes, other metallic particles and other dark dispersants, as well as dark dyes, in particular dark blue dyes and dark gray dyes.

The additives in the second layer 418 are chosen to reflect light, particular in a diffuse manner, i.e., randomly and evenly scattered, although materials that absorb and re-emit light are also suitable. Additives suitable for inclusion in the second layer include, but are not limited to, titanium dioxide, calcium carbonate, in particular precipitated calcium carbonate, barium sulfate, aluminum trihydrate, talc, zinc sulfide, diatomaceous silica, clay, chalk, ash, finely dispersed gases, stilbenes, azoles, coumarins, pyrazenes and napthalimides.

In one instance of this label embodiment 400, the first layer 416 is adjacent to the second surface 410 of the paper facestock 406. As used herein, adjacent means that the layer is in direct contact with the second surface of the paper facestock with no intervening layers. It is believed that in this instance, the first layer absorbs light passing through the paper facestock, thus increasing the opacity of the label. In another instance of this label embodiment the second layer 418 is adjacent to the second surface of the paper facestock. It is believed that in this instance, the second layer reflects light passing through the paper facestock, thus increasing the opacity of the label.

Figure 5:
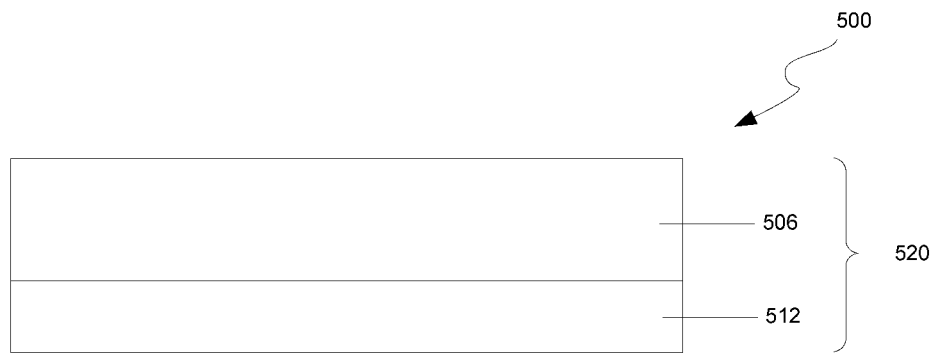
FIG. 5 is a sectional view of yet another example label according to a preferred embodiment.

In another label embodiment 500, as shown in FIG. 5, the paper facestock 506 includes at least one facestock additive and the layer of pressure sensitive adhesive 512 includes at least one adhesive additive. As a result of the inclusion of the at least one facestock additive and the at least one adhesive additive, the label has an opacity greater than if the at least one facestock additive and at least one adhesive additive were not included.

Pigments, fillers and optical brighteners can affect the brittleness, tensile strength and cuttability, among other attributes, of paper. Paper can become more brittle, have less tensile strength, be more difficult to cut and cause cutting blades to dull sooner than expected. Pigments, fillers and optical brighteners can affect the peel strength, tack, shear and viscosity, among other attributes, of adhesives. The adhesive can lose peel strength, tack and shear, and thus become less aggressive. The viscosity of the adhesive can increase making it difficult to apply to substrates 104. Because the physical properties of paper and adhesives can be negatively affected by additives, it can be difficult obtain sufficient opacity to block out underlying indicia 102 when the paper and adhesive are made into a label 500.

The level of additives in the pressure sensitive adhesive 512 is chosen to minimally impact the adhesive's properties while providing opacity. If the level of additives is too high, the PSA will have insufficient adhesive properties to allow the label 500 to adhere to envelopes and packages 104 during handling prior to delivery. If the level of additives is too low, underlying indicia 102 may be visible through the applied label.

The level of additives in the facestock sheet 506 is chosen to provide maximum opacity of the label 500 when attached to an envelope or package 104 while maintaining desirable properties including printability in laser and inkjet printers 302 and copiers, stiffness, machinability in processes used to manufacture labels, whiteness and brightness.

One method 600 of achieving the goal of opaque labels 200 is to include additives in the adhesive 212, as shown in step 608 of FIG. 6, to obtain as high an opacity as possible while maintaining adhesion to a substrate 104. The first three steps 602, 604 and 606, of the method provide additives, adhesive and paper pulp, respectively. Additive levels can be adjusted during the manufacture of the paper facestock in step 610 to achieve at least 94.8% opacity in the final product produced in step 612. In an alternative method 700, shown in FIG. 7, the first three steps 702, 704 and 706, involve providing additives, adhesive and paper pulp, respectively. The paper facestock 206 can be made as opaque as possible, step 708, while maintaining paper properties sufficient for converting. Then a sufficient amount of additives are included in the adhesive, step 710, to achieve 94.8% opacity in the label stock 520 (see later discussion) produced in step 712.

The at least one facestock additive can be chosen from, but not limited to, titanium dioxide, calcium carbonate, in particular precipitated calcium carbonate, barium sulfate, aluminum trihydrate, talc, zinc sulfide, diatomaceous silica, clay, chalk, ash, finely dispersed gases, stilbenes, azoles, coumarins, pyrazenes and napthalimides. Other acceptable facestock additive materials are those that increase the opacity of the paper facestock 206 by reflecting light rather than transmitting or absorbing light.

The at least one adhesive additive can include carbon black, metallic flakes, other metallic particles and other dark dispersants, as well as dark dyes, in particular dark blue dyes and dark gray dyes. Other materials that absorb light, rather than reflect or transmit light, can also be used.

Figure 8:
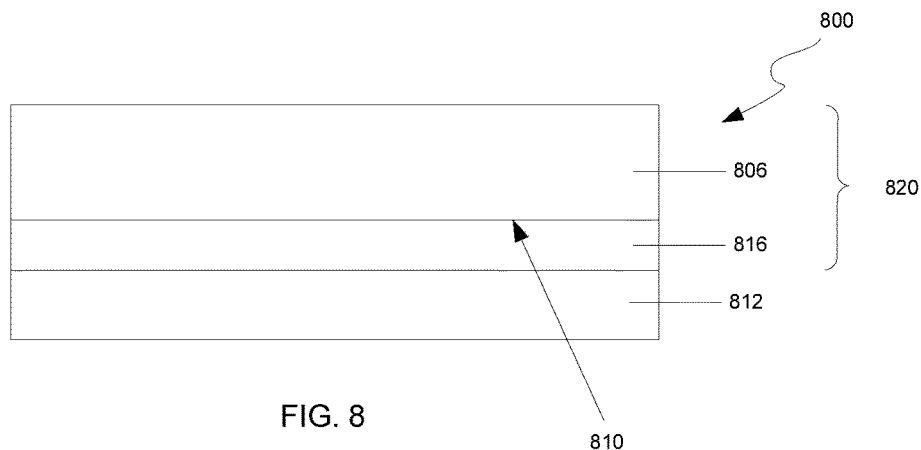
FIG. 8 is a sectional view of yet another example label according to a preferred embodiment.

In yet another label embodiment 800, shown in FIG. 8, a single pigmented layer 816 is coupled between the paper facestock 806 and the pressure sensitive adhesive 812. The pigmented layer preferably includes light absorbing materials. The light absorbing materials include carbon black, metallic flakes, other metallic particles and other dark dispersants, as well as dark dyes, in particular dark blue dyes and dark gray dyes. In one preferred instance, the pigmented layer is blue. In yet another label embodiment 800, shown in FIG. 8, a single pigmented layer 816 is coupled between the paper facestock 806 and the pressure sensitive adhesive 812. The pigmented layer preferably includes light absorbing materials. The light absorbing materials include carbon black, metallic flakes, other metallic particles and other dark dispersants, as well as dark dyes, in particular dark blue dyes and dark gray dyes. In one preferred instance, the pigmented layer is blue. Another, more detailed feature of the invention includes a pigmented layer that is coupled between the paper facestock and the pressure sensitive adhesive. The pigmented layer can include precipitated calcium carbonate and a blue pigment.

In yet another embodiment, the paper facestock 806 includes at least one whiteness enhancer. The at least one whiteness enhancer can include titanium dioxide, calcium carbonate, in particular precipitated calcium carbonate, barium sulfate, aluminum trihydrate, talc, zinc sulfide, diatomaceous silica, clay, chalk, ash, finely dispersed gases, stilbenes, azoles, coumarins, pyrazenes and napthalimides.

The paper facestock 806 is made with a grammage higher than current paper facestocks suitable for use in pressure sensitive labels. Grammage of paper facestocks suitable for use in pressure sensitive labels is approximately 70 g/m$^2$, and has a low enough opacity to allow underlying indicia 102 to be discerned. To increase the opacity, the pigmented layer 816 (also referred to as a back coat or size coat) is applied to the second surface 810 of the paper facestock. Preferably, the pigmented back coat is blue to have minimal impact on the whiteness of the label 800, but other colors may also prove useful. Useful blue pigment dyes include IRGALITE BLUE RL and IRGALITE BLUE RM (Ciba Specialty Chemicals of High Point, N.C.) and others. The grammage of the paper facestock and the pigmented back coat provide opacity to the finished label such that any underlying indicia are effectively blocked out. A preferred facestock paper grammage is approximately 90 g/m$^2$, while the pigmented back coat is preferably approximately 10 g/m$^2$.

The paper facestock 806 is coated with PSA 812 suitable for the label's intended use. Typically, permanent PSAs are used, for example in U.S. Pat. No. 6,423,392 to Carol A. Koch, et al., which is incorporated herein by reference in its entirety, but other types of PSAs, for example removable or repositionable adhesives, for example in U.S. Pat. No. 4,925,908 to Margaret Bernard, et al., which is incorporated herein by reference in its entirety, can be used. The adhesive is preferably coated at between approximately 15 g/m$^2$ to approximately 25 g/m$^2$, more preferably approximately 18 g/m$^2$ to approximately 20 g/m$^2$.

Any of the label embodiments 200, 400, 500 and 800 can further include an indicia-accepting layer 214 proximal to the first surface 208 of the paper facestock 206 as shown in FIG. 2. The indicia-accepting layer can be any of those known in the art to allow acceptance of ink-jet ink, laser toner, or hand-held writing instrument markings. In addition, the indicia-accepting layer can increase the opacity of the label, preferably by reflecting light.

All of the label embodiments 200, 400, 500 and 800 include at least two layers wherein one layer is a paper facestock 206, 406, 506, and 806 and the other layer is an adhesive 212, 412, 512 and 812. Additional layers 416, 418 and 816 can also be present, as previously discussed. The labels herein described are meant to remain intact during use, that is, the labels are not intended to delaminate. The entire label should be removable from the substrate 104 when removable or ultraremovable adhesives are used, or the label should tear upon removal from the substrate when a permanent adhesive is used. In neither the removal/ultraremovable nor permanent adhesive cases should the layers of the label separate from one another.

TABLE

| Material Description | Opacity | L* | b* | Brightness |
|---|---|---|---|---|
| Example Embodiment | 99.8% | 95.0 | −8.3 | 100.2% |
| Label 1 | 94.7% | 94.4 | −9.2 | 98.9% |
| Label 2 | 99.5% | 91.6 | −3.5 | 84.4% |
| Label 3 | 93.0% | 92.8 | −5.6 | 90.5% |
| Label 4 | 92.2% | 92.9 | −5.5 | 90.6% |

Comparison of labels 200 is shown in the TABLE above. An example embodiment of the present invention is shown to have an opacity of 99.8%, an L* of 95.0, a b* of −8.3 and a brightness of 100.2%. Label 1 is SKU 5165, white laser labels from Avery Dennison Corporation (Pasadena, Calif.), Label 2 is OL1 75BT white laser blackout labels from Online Labels Incorporated (Longwood, Fla.), Label 3 is CEG03212 white laser labels from Corporate Express (Broomfield, Colo.) and Label 4 is CEG03256 white ink jet labels also from Corporate Express. Only the example embodiment meets the criteria of having an opacity of greater than or equal to approximately 94.8%, a brightness value of greater than or equal to approximately 90.2%, a CIELAB L* greater than or equal to approximately 92.5%, and a CIELAB b* less than or equal to approximately −0.91.

Figure 9:
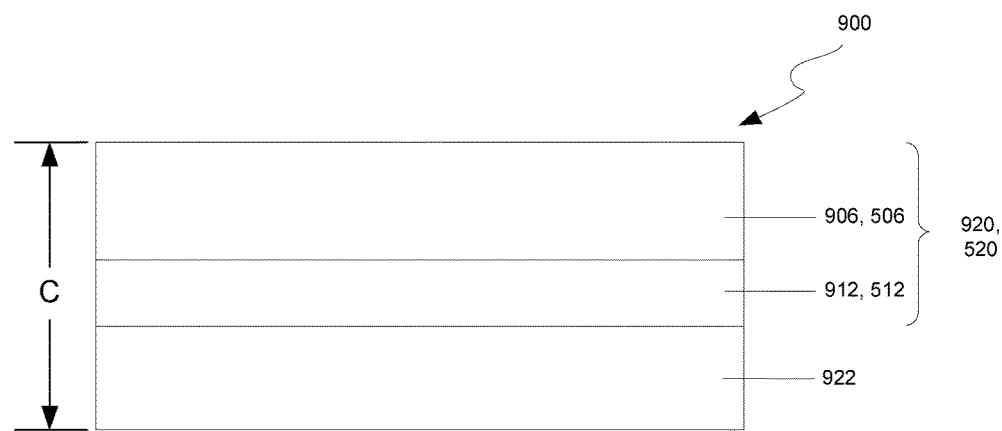
FIG. 9 is a sectional view of an example label sheet according to a preferred embodiment that corresponds to the label of FIG. 5.
Figure 10:
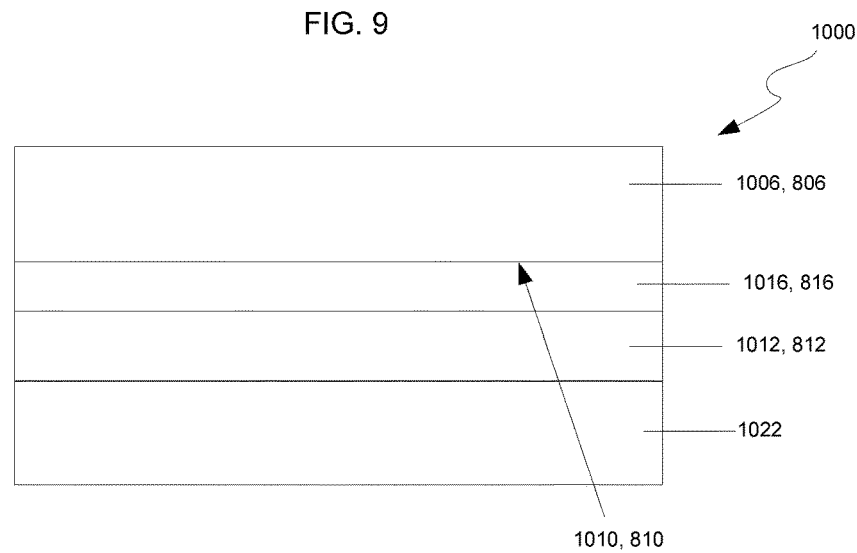
FIG. 10 is a sectional view of example label sheet according to a preferred embodiment that corresponds to the label of FIG. 8.

A label sheet embodiment 900 using the label stock 520 of FIG. 5 is shown in FIG. 9 and a label sheet embodiment 1000 using the label stock 820 of FIG. 8 is shown in FIG. 10. Label sheet embodiments 900 and 1000 can be made by adding a release-coated liner 922 and 1022, respectively, to any of the label embodiments. The release-coated liner is used to protect the pressure sensitive adhesive 912 and 1012 and to allow the adhesive-backed label to be passed through a printer 302, in particular, a desktop printer that can be attached to a personal computer 304 (see FIG. 3). The release-coated liner can be those routinely used for label manufacture including paper, film and film-coated paper liners. Any release system is suitable in which the release value is greater than or equal to approximately 50 grams per 2 inches. Release systems can include silicones, waxes, fluorocarbons and other abherant materials. The release coating usually less than or equal to approximately 2 g/m².

Figure 11:
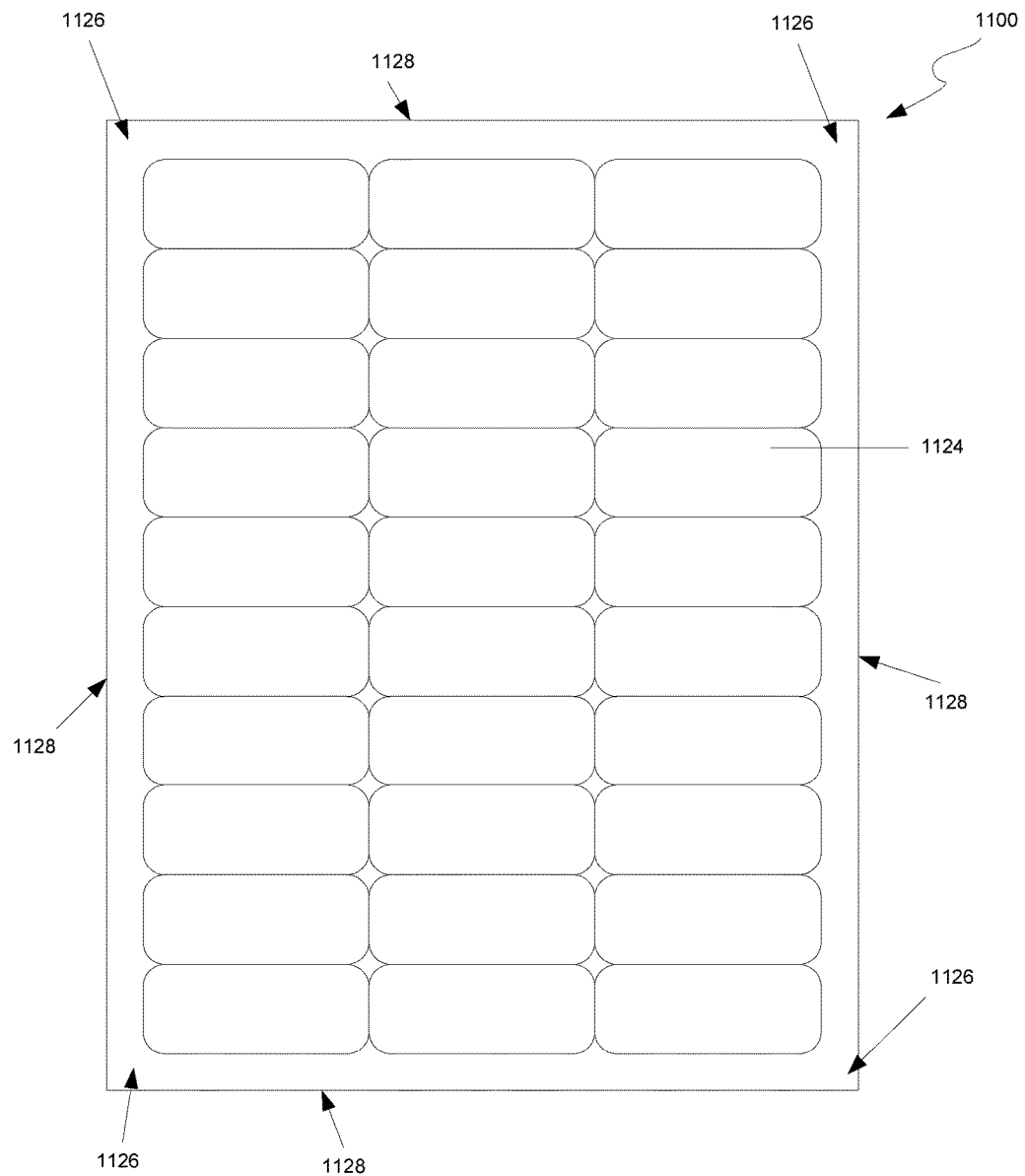
FIG. 11 is a top plan view of an example label sheet according to a preferred embodiment.

Referring additionally to FIG. 11, label sheets 1100 having labels 1124 are generally meant to be printed upon by handheld writing instruments or printers 302. Label sheets intended to be printed upon using a printer are constructed to allow passage through the printer without becoming caught on any of the printer's mechanical parts. Some of the many concerns regarding the construction of the label sheet include the thickness and curl, or flatness, of the label sheet to be printed.

Printers 302 are made with tight tolerances and tight turns in the path a label sheet 1100 follows while being printed. Label sheets that are too thick or high in caliper can have difficulties during transport through a printer. Thick label sheets can be improperly picked up by the paper transport mechanism resulting in a jam as the sheet enters the printer. Even if a thick sheet is transported successfully into a printer, tolerances between rollers may prevent the sheet from completing the paper path without becoming stuck inside the printer. Also, if the sheet is too thick, it may be too stiff to bend around the printer's internal rollers and become jammed inside the printer. Preferred embodiments of the label sheet have an overall caliper ("C") (see also FIG. 9) of less than or equal to approximately +0.01 inch, or 10 mils.

The lower limit for caliper is usually not an issue for label sheets 1100. Because the label sheet includes a paper facestock 906, a layer of adhesive 912 and a release-coated liner, 922 the sheet is usually thick enough to avoid printing difficulties associated with thin sheets. The difficulties that can be encountered with thin sheets include the sheet not being picked up by the sheet transport mechanism of the printer 302 and jamming inside the printer because the sheet is not stiff enough. Sheets with insufficient stiffness do not follow the printer's paper path because free edges can bend out of the paper path and become caught on internal printer parts. Additionally, label sheets that are too thin can have labels insufficiently opaque to hide covered indicia 102 on a substrate 104 to which the label 1124 has been applied. Preferred embodiments of the label sheet have an overall caliper of greater than or equal to approximately +0.003 inch, or 3 mils.

Curl is a measure of how well a label sheet 1100 conforms to planarity. Curl can be especially pronounced as the corners 1126 of the label sheet and if the magnitude of the curl is too high, the corners of the sheet can become lodged inside a printer 302 during printing. Curl can be determined by placing a label sheet on a flat surface in a controlled environment with the paper facestock 906 away from the flat surface. Each corner can be inspected and the deflection of any corner lifted from the flat surface is measured and recorded as a positive curl value. The label sheet is then placed onto the flat surface with the paper facestock against the flat surface. Again, the deflection of any corner lifted from the flat surface is measured, this time being recorded as a negative curl measure. A label sheet having maximum curl values less than or equal to approximately +0.5 inch in magnitude are acceptable. A label sheet having maximum curl values less than or equal to approximately +0.25 inch in magnitude is preferred. One example embodiment has measured curl values between approximately +0.25 inch and approximately −0.5 inch.

One embodiment of a label sheet 1100 includes a label stock 920 (see FIG. 9) and a release-coated liner 922. The label stock includes a paper facestock 906 and a layer of pressure sensitive adhesive 912. The release-coated liner is coupled to the layer of pressure sensitive adhesive. The label stock has an opacity greater than or equal to approximately 94.8%. The label stock has a whiteness index greater than or equal to approximately 155, or alternatively, a brightness greater than or equal to approximately 90.2%, a CIELAB L* greater than or equal to approximately 92.5 and a CIELAB b* less than or equal to approximately −0.91. The total caliper of the label sheet is less than or equal to approximately +0.01 inch, or 10 mils.

An opaque label sheet 1100 of the present invention is machine printable in laser and inkjet printers 302 and copiers and has the following performance characteristics:

1) Total label sheet thickness: +0.010 inch maximum
2) Curl: +0.5 inch maximum at any corner 1126 of the sheet
3) Release: The force required to remove a label 1124 from the release-coated liner 922 is at least 30 g/2 inch (5.08 cm).
4) Smooth Edges: Edges 1128 are free of nicks and tears. No adhesive ooze at sheet edges Referring to FIG. 12, one embodiment of a method for manufacturing a label stock 1200 includes the steps of providing a paper facestock 1202, providing a pressure sensitive adhesive 1204 and coupling the pressure sensitive adhesive to the paper facestock 1206. The label stock 920 thus formed has an opacity greater than to equal to approximately 94.8%. The label stock also includes a whiteness index greater than or equal to approximately 155, or alternatively, a brightness greater than or equal to approximately 90.2%, a CIELAB L* greater than or equal to approximately 92.5, and a CIELAB b* less than or equal to approximately −0.9.

Figures 12, 13:
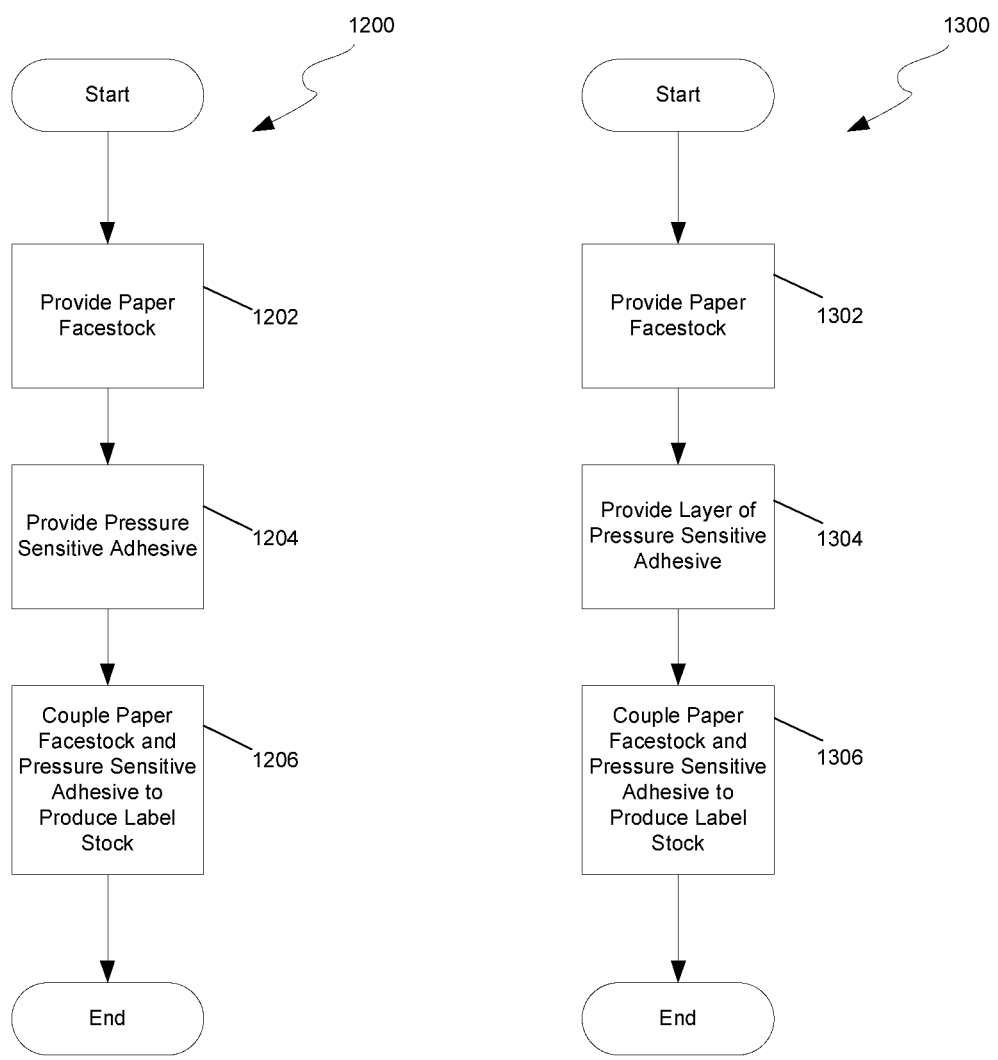
FIG. 12 is a flowchart of an example method to produce a label stock according to the invention.
FIG. 13 is a flowchart of another example method to produce a label stock according to the invention.

Referring to FIG. 13, another embodiment of a method for manufacturing a label stock 1300 includes providing a pressure sensitive adhesive 912 in the form of a layer 1304 and providing a paper facestock 1302. The step of coupling the layer of pressure sensitive adhesive to the paper facestock includes laminating the pressure sensitive adhesive layer and facestock together 1306 to produce the label stock.

Figure 14:
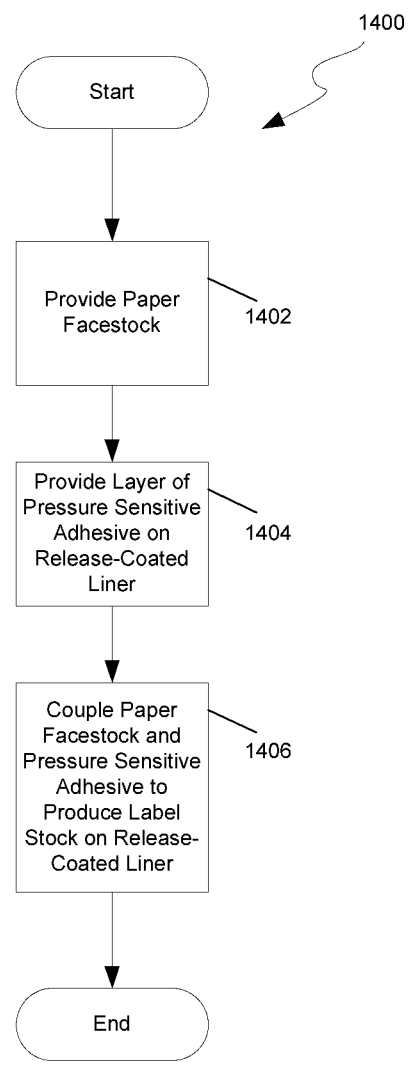
FIG. 14 is a flowchart of another example method to produce a label stock according to the invention.

Referring to FIG. 14, yet another embodiment of a method for manufacturing a label stock 1400 includes the pressure sensitive adhesive 912 being provided on a release-coated liner 922 at step 1404. The pressure sensitive adhesive can be applied to the release-coated liner by any known means, including die coating, curtain coating, extrusion and spray coating. A paper facestock 906 is provided in step 1402. Laminating the pressure sensitive adhesive layer and the facestock together 1406 produces the label stock attached to the release coated liner.

Those skilled in the art of manufacturing pressure sensitive adhesive labels 200, 400, 500, 800, particularly those designed for use with desktop printers 302, are able to produce flat label sheets 1100. Methods known to those skilled in the art include balancing the tension of the paper facestock 906 and release-coated liner 922 during fabrication and balancing the moisture levels of the paper components of the label sheet. The moisture level in the label sheet can be adjusted by heating any or all of the layers 206, 212, 406, 412, 416, 418, 1006, 1012, 1016, 1022 to lower the moisture level or by subjecting any or all of the layers to steam to increase the moisture level. Both the paper facestock and the release coated liner, if made of paper, can be subjected to these treatments to balance the moisture level.

Another embodiment of a method for manufacturing a label stock 920 includes the paper facestock 906 and pressure sensitive adhesive 912 being permanently attached. The paper facestock and pressure sensitive adhesive should not delaminate from one another during use.

Test Methods

The properties of the labels 200, 400, 500, 800 of the present invention can be characterized by various analytical techniques. A brief description of these analytical techniques is given below:

Opacity Test Method: A typical method involves measuring the contrast ratio of a PSA label 1124 when it's placed in front of white and black backgrounds. This test may be performed using a MACBETH COLOR-EYE 2020 PLUS spectrophotometer (Gretag-Macbeth AG of Regensdorf, Switzerland). A typical PSA, white, uncoated (for example, an indicia-accepting layer 214 is absent) label made with 50# basis weight paper can have an average opacity of approximately 92%.

Brightness Test Method: A typical method involves measuring the reflectance of light from a PSA label 1124 that has been placed in front of a white background. This test may be performed using equipment such as a MACBETH COLOR-EYE 2020 PLUS spectrophotometer. A typical PSA, white, uncoated label made with a 50# basis weight paper can have an average brightness of approximately 93.

Color Test Method: This test is typically performed on a spectrophotometer, such as the MACBETH COLOR-EYE 2020 PLUS spectrophotometer. The amount of each wavelength of light reflected or transmitted from a PSA white uncoated label specimen 1124 is measured. Various daylight and fluorescent illuminates may be used during the test, such as D65 (Average North Sky Daylight) and CWF (Interior cool white fluorescent). The results are given in values of L* (lightness/darkness), a* (redness/greenness) and b* (blueness/yellow). A typical PSA, white, uncoated label made with 50# basis weight paper can have L*, a* and b* average values of approximately 93, approximately 1.5 and approximately −3.9, respectively.

Whiteness Index: This test is conducted in accordance with ASTM E313 for yellowness and whiteness indices using a spectrophotometer, such as a DR. LANGE MICRO COLOR spectrophotometer (Dr. Lange GmbH of Dusseldorf, Germany). The color of the label sample 1124 is compared to a standard white reference sample using various illuminates as described above. A typical white uncoated label can have a whiteness index value of 155. Currently available opaque labels can have a whiteness value of 133.

Curl Test Method: Samples to be tested are acclimated in a controlled environment of 23° C.±2° and 50%±1% relative humidity for at least 24 hours. The sample 1100 is placed on a flat surface with the paper facestock 206 away from the flat surface and away from drafts. An end of a steel rule scale is placed on the flat surface next a corner 1126 of the sample. The distance the corner is lifted from the flat surface is measured and rounded to the nearest 32nd of an inch as a positive number. The measurement is recorded for each corner of the sample. The sample is then flipped over so that the paper facestock is in contact with the flat surface. The measurements for each corner are repeated as above except the values are recorded as negative numbers.

All of the features disclosed in the specification, including the claims, abstract, and drawings, and all of the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

We claim:

1. A block out label comprising:
    (a) a paper facestock having an upper surface and a lower surface;
    (b) a pigmented layer, the pigmented layer having an upper surface and a lower surface, wherein the pigmented layer is located beneath the lower surface of the paper facestock and is formed from precipitated calcium carbonate and blue pigment; and
    (c) a pressure sensitive adhesive layer, the pressure sensitive adhesive having an upper surface and a lower surface, wherein the pressure sensitive adhesive layer is located beneath the lower surface of the pigmented layer, such that:
    (d) the label has:
        (i) an opacity greater than or equal to approximately 94.8 percent, and
        (ii) one or both of the following:
            (1) a whiteness index greater than or equal to approximately 155, and
            (2) a brightness greater than or equal to approximately 90.2%, a CIELAB L* greater than or equal to approximately 92.5, and a CIELAB b* less than or equal to approximately −0.91,
    wherein the opacity, the whiteness index, and the brightness are measured at the upper surface of the facestock, and
    wherein the combination of the elements (a) through (c) of the label comprising the characteristics of (d) yields the block out label that blocks out one or more pieces of indicia that lies beneath the lower surface of the pressure sensitive adhesive layer once the block label is placed there over.

2. The block out label of claim 1, wherein the pigmented layer comprises:
    (b1) a first primer layer having an upper surface and a lower surface; and
    (b2) a second primer layer having an upper surface and a lower surface, the second primer layer being located beneath the lower surface of the first primer layer,
    wherein the first primer layer and the second primer layer are both located between the lower surface of the paper facestock and the upper surface of the pressure sensitive adhesive layer, and
    wherein the first primer layer is configured to reflect light and includes a primer and precipitated calcium carbonate and wherein the second primer layer is configured to absorb light and includes a primer and blue pigment.

3. The block out label of claim 1, wherein the pigmented layer is a single layer including both the precipitated calcium carbonate and blue dye.

4. The block out label of claim 1, wherein the paper facestock includes at least one whiteness enhancer.

5. The block out label of claim 1, further comprising an indicia-accepting layer located above the upper surface of the paper facestock.

6. The block out label of claim 1, wherein the pressure sensitive adhesive layer comprises a permanent pressure sensitive adhesive.

7. The block out label of claim 1, wherein the opacity of the block label of claim 1 is greater than or equal to approximately 99.7%.

8. A block out label comprising:
(A) a paper facestock having an upper surface and a lower surface;
(B) a pigmented layer, the pigmented layer having an upper surface and a lower surface, wherein the pigmented layer is located beneath the lower surface of the paper facestock and is formed from precipitated calcium carbonate and blue pigment; and
(C) a pressure sensitive adhesive layer, the pressure sensitive adhesive having an upper surface and a lower surface, wherein the pressure sensitive adhesive layer is located beneath the lower surface of the pigmented layer, such that:
(D) the label has:
(i) an opacity greater than or equal to approximately 94.8 percent, and
(ii) one or both of the following:
(1) a whiteness index greater than or equal to approximately 155, and
(2) a brightness greater than or equal to approximately 90.2%, a CIELAB L* greater than or equal to approximately 92.5, and a CIELAB b* less than or equal to approximately −0.91,
wherein the opacity, the whiteness index, and the brightness are measured at the upper surface of the facestock,
wherein the paper facestock further comprises at least one additive selected from titanium dioxide, precipitated calcium carbonate, ash, or any suitable combinations thereof, and
wherein the combination of the elements (A) through (C) of the label comprising the characteristics of (D) yields the block out label that blocks out one or more pieces of indicia that lies beneath the lower surface of the pressure sensitive adhesive layer once the block label is placed there over.

9. The block out label of claim 8, wherein the pigmented layer comprises:
(B1) a first primer layer having an upper surface and a lower surface; and
(B2) a second primer layer having an upper surface and a lower surface, the second primer layer being located beneath the lower surface of the first primer layer,
wherein the first primer layer and the second primer layer are both located between the lower surface of the paper facestock and the upper surface of the pressure sensitive adhesive layer, and
wherein the first primer layer is configured to reflect light and includes a primer and precipitated calcium carbonate and wherein the second primer layer is configured to absorb light and includes a primer and blue pigment.

10. The block out label of claim 8, wherein the pigmented layer is a single layer including both the precipitated calcium carbonate and blue dye.

11. The block out label of claim 8, wherein the paper facestock includes at least one whiteness enhancer.

12. The block out label of claim 8, further comprising an indicia-accepting layer located above the upper surface of the paper facestock.

13. The block out label of claim 8, wherein the pressure sensitive adhesive layer comprises a permanent pressure sensitive adhesive.

14. The block out label of claim 8, wherein the opacity of the block label of claim 8 is greater than or equal to approximately 99.7%.

15. A block out label sheet comprising:
(i) a paper facestock having an upper surface and a lower surface;
(ii) a pigmented layer, the pigmented layer having an upper surface and a lower surface, wherein the pigmented layer is located beneath the lower surface of the paper facestock and is formed from precipitated calcium carbonate and blue pigment;
(iii) a pressure sensitive adhesive layer, the pressure sensitive adhesive having an upper surface and a lower surface, wherein the pressure sensitive adhesive layer is located beneath the lower surface of the pigmented layer; and
(iv) a release liner layer having an upper surface and a lower surface, wherein the release liner layer is located beneath the lower surface of the pressure sensitive adhesive layer, such that:
(v) elements (i) through (iii) form a block out label that has:
(a) an opacity greater than or equal to approximately 94.8 percent, and
(b) one or both of the following:
(1) a whiteness index greater than or equal to approximately 155, and
(2) a brightness greater than or equal to approximately 90.2%, a CIELAB L* greater than or equal to approximately 92.5, and a CIELAB b* less than or equal to approximately −0.91,
wherein the opacity, the whiteness index, and the brightness are measured at the upper surface of the facestock, and
wherein the combination of the elements (i) through (iii) of the label comprising the characteristics of (v) yields the block out label that blocks out one or more pieces of indicia that lies beneath the lower surface of the pressure sensitive adhesive layer once the block label is placed there over.

16. The block out label sheet of claim 15, wherein the pigmented layer comprises:
(ii1) a first primer layer having an upper surface and a lower surface; and
(ii2) a second primer layer having an upper surface and a lower surface, the second primer layer being located beneath the lower surface of the first primer layer,
wherein the first primer layer and the second primer layer are both located between the lower surface of the paper facestock and the upper surface of the pressure sensitive adhesive layer, and
wherein the first primer layer is configured to reflect light and includes a primer and precipitated calcium carbonate and wherein the second primer layer is configured to absorb light and includes a primer and blue pigment.

17. The block out label sheet of claim 8, wherein the pigmented layer is a single layer including both the precipitated calcium carbonate and blue dye.

18. The block out label sheet of claim 15, wherein the paper facestock includes at least one whiteness enhancer.

19. The block out label sheet of claim 15, further comprising an indicia-accepting layer located above the upper surface of the paper facestock.

20. The block out label sheet of claim 15, wherein the pressure sensitive adhesive layer comprises a permanent pressure sensitive adhesive.

21. The block out label sheet of claim 15, wherein the opacity of the block label of claim 15 is greater than or equal to approximately 99.7%.

22. The block out label sheet of claim 15, wherein the label sheet has a total caliper of less than or equal to approximately 0.01 inch.

23. The block out label sheet of claim 15, wherein the block out label sheet further includes at least one corner and the at least one corner has a curl value of between about −0.5 inches and about +0.25 inches.

24. The block out label sheet of claim 15, wherein force required to separate the block out label, as defined by elements (i) through (iii), from the release liner is at least about 50 grams per 2 square inches.

\* \* \* \* \*